Aug. 17, 1965    G. W. JACKSON    3,200,844
SNAP ACTION VALVING MECHANISM
Filed Nov. 29, 1963    2 Sheets-Sheet 1

INVENTOR.
GEORGE W. JACKSON
BY
J. C. Evans
HIS ATTORNEY

Aug. 17, 1965    G. W. JACKSON    3,200,844
SNAP ACTION VALVING MECHANISM
Filed Nov. 29, 1963    2 Sheets-Sheet 2
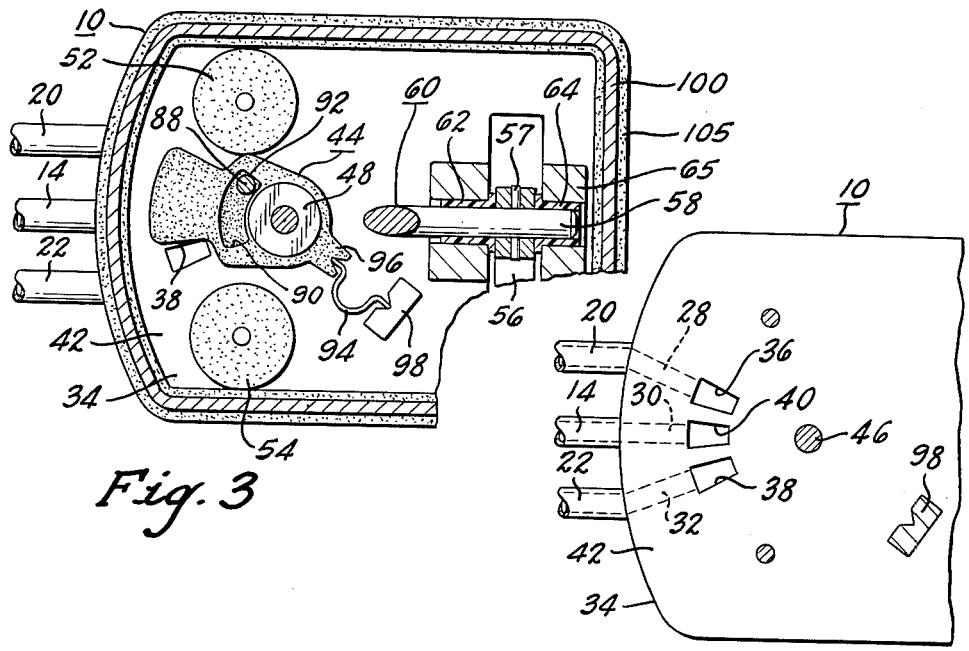
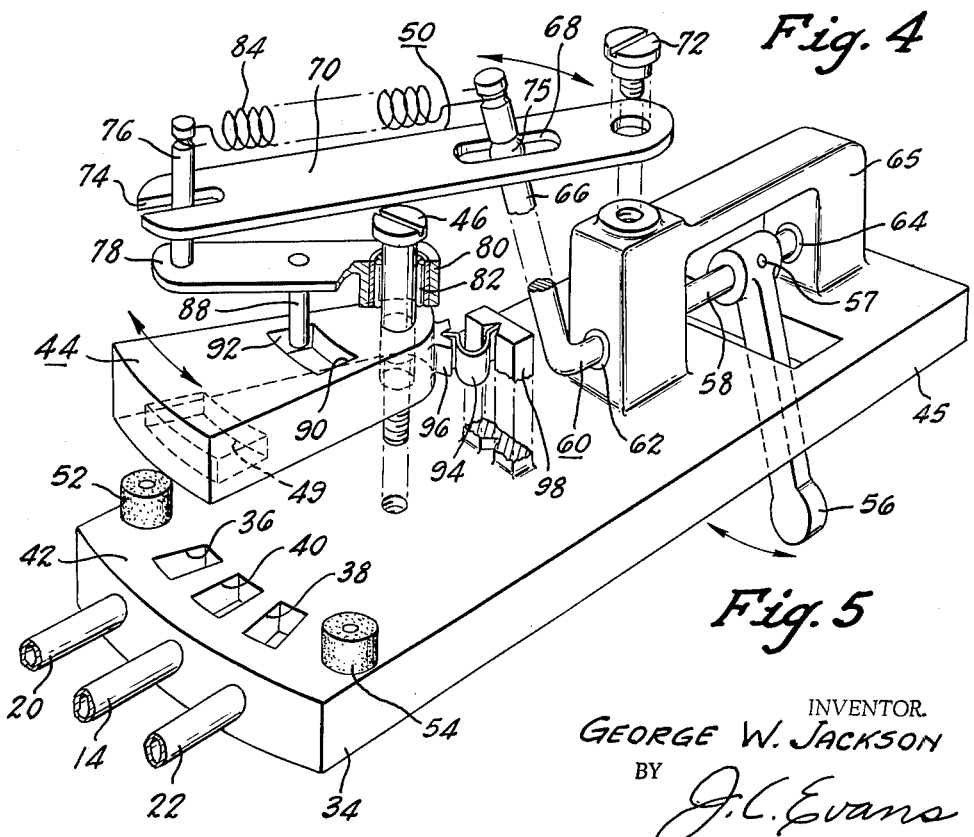
INVENTOR.
GEORGE W. JACKSON
BY
HIS ATTORNEY

United States Patent Office 3,200,844
Patented Aug. 17, 1965

3,200,844
SNAP ACTION VALVING MECHANISM
George W. Jackson, Dayton, Ohio, assignor to General Motors Corporation, Detroit, Mich., a corporation of Delaware
Filed Nov. 29, 1963, Ser. No. 326,812
7 Claims. (Cl. 137—625.2)

This invention relates to distributing valves and more particularly to selectively positionable valves for controlling fluid flow through a plurality of passageways.

An object of the present invention is to improve distributing valve arrangements having a valving element in sliding engagement with a housing portion by the provision of actuator means therein for quietly and quickly positioning the valving element component of the valve in its operable positions.

A further object of the present invention is to provide a selector valve arrangement wherein a distributing valve element assumes spaced, alternately selected rotative positions with respect to a housing having passageways intercommunicated by the valving element including improved means therein for preventing excessive clicking noises or the like as the valving element is moving into its selected operating positions and further including improved means for effecting a rapid snap-action movement of the valving element to its operating positions in response to a slight valve actuating force.

Further objects and advantages of the present invention will be apparent from the following description, reference being had to the accompanying drawings wherein a preferred embodiment of the present invention is clearly shown.

In the drawings:

FIGURE 3 is a cross-sectional view taken along the line 3—3 of FIGURE 2;

FIGURE 4 is a cross-sectional view taken along the line 4—4 of FIGURE 2; and

FIGURE 5 is an exploded view in perspective of the invention.

Figure 1:
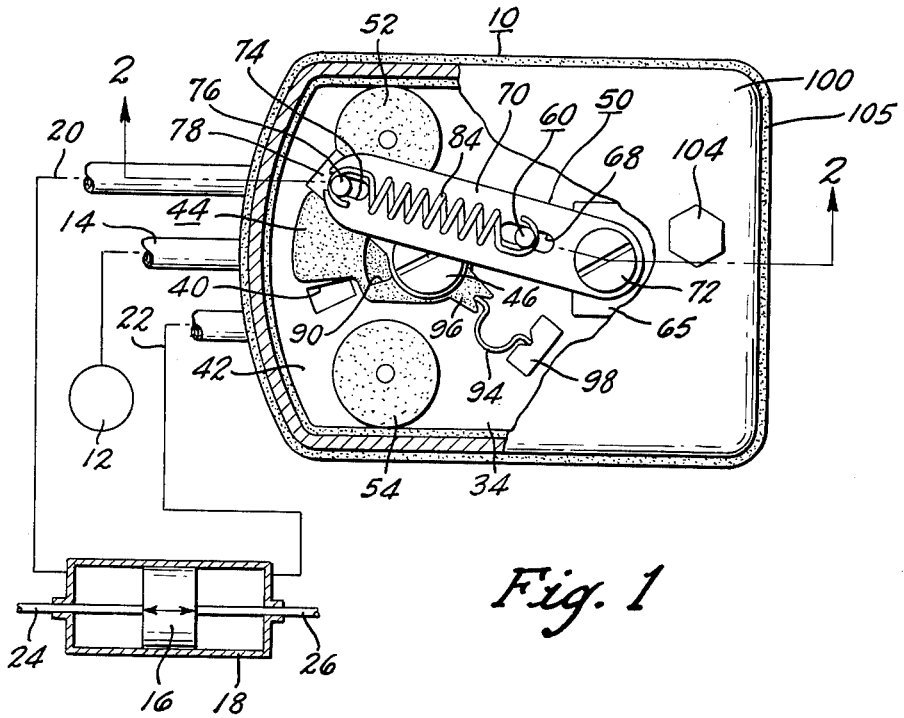
FIGURE 1 is a partially sectioned, elevational view of the selector valve of the present invention.
Figure 2:
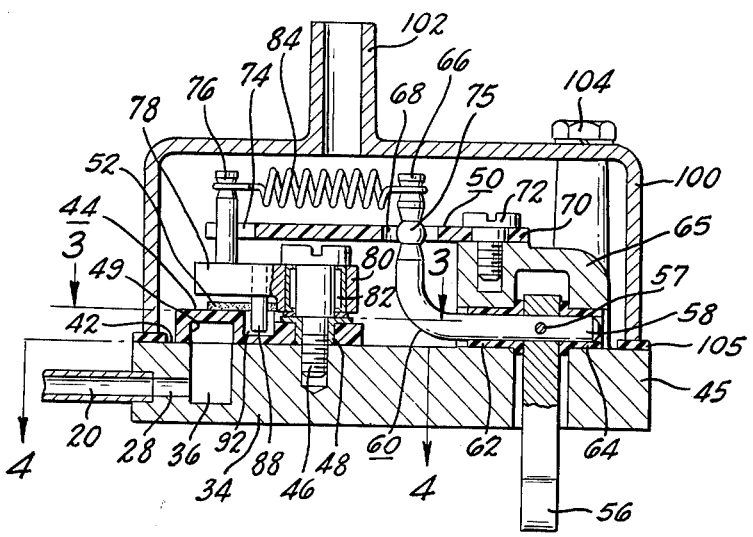
FIGURE 2 is a cross-sectional view taken along the line 2—2 of FIGURE 1.

Referring now to the drawings in FIGURE 1 one embodiment of the distributing valve arrangement 10 of the present invention is representatively shown associated with a fluid system including a source of pressure 12. A conduit 14 connects pressure source 12 to the valve 10 which is operative to alternately direct pressurized fluid to one side or the other of a reciprocable piston 16 within a cylinder unit 18 through either conduits 20, 22. The valve 10 also serves to alternately communicate the piston side opposite the pressurized piston side to atmosphere through conduits 20, 22 to thereby effect reciprocation of piston 16 and piston rods 24, 26 connected thereto. The rods 24, 26 may be directed exteriorly of cylinder unit 18 where they might, for example, control a component of a hydraulic machine in response to actuation of valve 10.

As best seen in FIGURE 4, the conduits 14, 20, 22 communicate, respectively, with spaced passageways 28, 30, 32 through the base or body 34 of the improved valve 10. The body 34 is also provided with two ports 36, 38 positioned equidistantly on each side of a port 40 with ports 36, 38 and 40, respectively, intersecting passageways 28, 30, 32.

The body 34 has a planar face 42 thereon at the ports 36, 38, 40 on which a valving element 44 is pivotally secured by a screw element 46 directed through a sleeve bearing 48 inserted in element 44 at one end thereof into threaded engagement with the body 34. The sleeve bearing 48 is preferably constructed of a low coefficient of friction material from a grouping of materials set forth in greater detail subsequently.

The opposite end of the valving element 44 has an arcuately-shaped passageway 49 therein having a portion thereof overlying the pressure port 40 in face 42 and other portions thereof alternately overlying the ports 36, 38 upon limited rotation of the valving element 44 about the pivot point defined by the axis of screw element 46 as produced by an actuating linkage assembly 50 of the selector valve assembly to thereby serve to selectively intercommunicate the compartments on either side of piston 16 with atmosphere and the pressure source so as to cause reciprocation of piston rods 24, 26. One feature of valve 10 is that ports 36, 38, 40 are trapezoidally shaped to require less valve travel in the selecting process.

The valving element 44 preferably is constructed of a plastic material with relatively low coefficient of friction and resilient properties such as are found in the representative group including Zytel, a nylon resin; Alathon, a polyethylene resin; Teflon, a tetrafluoroethylene resin; Delrin, an acetal resin; and nylon, with it being understood that other plastics having low coefficients of friction and relatively good resiliency might be equally well suited for use in the present invention. By so constructing the valving element, it will smoothly slide on the face 42 during a valve switching operation. Furthermore, spaced, limiting bumpers 52, 54 secured on the face 42 on either side of the valving element 44 are constructed of rubber or the like to damp against "clicking" or other disturbing noises in the system.

Referring now more particularly to the valve actuating linkage assembly 50, it will be seen that the assembly is comprised of a crank or selector arm 56 having a manually actuatable end representatively shown as being directed through and disposed beneath body 45 in FIGURE 5. The crank arm 56 has the opposite end thereof secured by a pin 57 to one end 58 of a bent swivel arm 60, the end 58 being rotatably supported in sleeve bearings 62, 64 supported in a bearing frame 65 on the body portion 34 located at a point thereon spaced from the valving element 44. The sleeve bearings 62, 64, like bearing 48 and valving element 44, are constructed of a low coefficient of friction plastic material of the type discussed above for reducing frictional losses caused by rotation of the end 58 of swivel arm 60 by crank arm 56. Opposite end 66 of the bent swivel arm 60 is offset ninety degrees from end 58 and directed through an opening 68 in an elongated cantilevered actuating arm 70 having one end thereof pivotally secured on one end of frame 65 by a screw element 72 directed through arm 70 into threaded engagement with frame 65. In order to minimize galling of arm 70 by arm 60 a spherically shaped bearing surface 75 is formed on arm 60 at the intersection thereof with arm 70.

The opposite end of the actuating arm 70 is slotted at 74 to receive a pin 76 connected to a distributing arm or lever 78 located intermediate the actuating arm 70 and the valving element 44 wherein lever 78 has one of its ends 80 rotatably supported on the screw element 46 by a needle bearing 82 carried by arm end 80. In the illustrated embodiment, the terminus of the bent end 66 of swivel arm 60 is connected to one end of an elongated spring element 84 having the opposite end thereof connected to the outer end of the pin 76 on distributor arm 78 for producing a snap-action movement of arm 78 when the spring passes to one or the other side of the center axis of pivot screw 46.

The actuating arm 70 is constructed of a light-weight plastic material having a low coefficient of friction, for example, Delrin, whereby frictional losses between it, screw 72 and swivel arm 60 are minimized. Accordingly, upon movement of the crank arm 56, the bent end 66 of swivel arm 60 will oscillate about the axis of the end 58 thereof to move the actuating arm 70 in a limited rotative path about the pivot point thereof to shift the pin 76 along with the intermediate distributor arm or lever 78 in a limited rotative path about the pivot point defined by the needle bearing 82 on screw 48. Upon such limited rotative movement of the distributing arm 78, a tab portion 88 depending therefrom alternately engages spaced surfaces 90, 92 located in the outer face of the valving element 44 on either side thereof with the snap movement of the distributing arm 78 produced by spring element 84 producing a highly responsive selecting action.

In the illustrated embodiment, a semicircular toggle spring element 94 connected between an outwardly directed portion 96 on the pivoted end of valving element 44 and a support 98 fixedly secured to the housing portion 34 radially inwardly of the valving element 44 produces snap action movement of valving element 44 as it begins to be moved by depending tab 88 on distributing arm 78 sufficiently to shift spring 94 into opposite off-center positions.

In the improved distributing valve arrangement, the use of lightweight, low coefficient of friction components including elements of the above-described type along with the shape of ports 36, 38, 40 assures that the assembly will be quickly responsive to a limited actuating force on crank arm 56, and, furthermore, the arrangement of springs 84, 94 in the system will produce a rapid shift of the valving element 44 into its operating positions. This arrangement along with the illustrated lever arm arrangement discussed above produces a distributing valve assembly having relatively low inertial characteristics and, hence, unusually good response.

In order to protect the operative parts of the valve assembly a cap 100 having a tubular extension 102 thereon for communicating the interior thereof with atmosphere is arranged to cover the operative parts. More particularly, cap 100 is secured to the end face of housing portion 34 by studs 104 and an annular gasket 105 fits between portion 34 and the edge of cap 100 to prevent the entrance of a foreign matter thereacross.

While the embodiment of the present invention as herein disclosed constitutes a preferred form, it is to be understood that other forms might be adopted.

What is claimed is as follows:

1. A two-way valve structure comprising housing means, means forming first, second and third passageways in said housing means, means forming first and second ports in said housing means for connecting said first and second housing passageways to a source of atmospheric pressure, means forming an additional port in said housing adapted to be connected through said third passageway with another pressure source, a movable valving element sealingly engaging said housing means including passageway means therein for alternately connecting one of said first and second ports with said additional port while leaving the other of said first and second ports exposed to atmosphere to effect a pressure differential between said first and second ports, valve actuator means for moving said valving element into selected positions to effect a reversal of the pressure differential between said first and second ports by reversing the connection of said first and second ports with said additional port and atmosphere, said valve actuator means including a control arm, an elongated actuator arm pivoted at one end thereof on a first axis, a lever disposed between said elongated actuator arm and said valving element pivoted at one end thereof on a second axis, said valving element being pivotable on said second axis, an elongated bent lever having one end located in spaced relationship to said first and second pivot axes and another end offset substantially perpendicularly to said one end, means connecting said another end to said control arm for moving said one end of said bent lever in a limited rotative path, said one end having a spherically shaped bearing surface thereon in engagement with a portion of said actuator arm for effecting movement thereof about said first axis, and means including said lever for transferring movement of said actuator arm to said valving element to effect movement thereof into preselected controlling positions.

2. In the combination of claim 1, said actuator arm being constructed of a low coefficient of friction plastic material for reducing noise transmission and for improving valve responsiveness by reducing inertia therein.

3. A two-way valve structure comprising housing means, means forming first, second and third passageways in said housing means, means forming first and second ports in said housing means for connecting said first and second housing passageways to a source of atmospheric pressure, means forming an additional port in said housing adapted to be connected through said third passageway with another pressure source, a movable valving element sealingly engaging said housing means including passageway means therein for alternately connecting one of said first and second ports with said additional port while leaving the other of said first and second ports exposed to atmosphere to effect a pressure differential between said first and second ports, valve actuator means for moving said valving element into selected positions to effect a reversal of the pressure differential between said first and second ports by reversing the connection of said first and second ports with said additional port and atmosphere, said valve actuator means including a control arm, an elongated actuator element pivoted on said housing means, first linkage means between said control arm and said actuator element for effecting pivotable movement of said actuator element upon movement of said control arm, lost motion means operatively associating said actuator element with said valving element, means including first spring means for snapping said lost motion means into opposite valving element engaging positions, and second spring means for snapping said valving element into preselected controlling positions upon movement thereof by said lost motion means.

4. In the combination of claim 3, means for reducing friction losses between said valving element and said housing means, and means for reducing noise emanating from the valve including resilient damping means for limiting the movement of said valving element.

5. A two-way valve structure comprising housing means, means forming first, second and third passageways in said housing means, means forming first and second ports in said housing means for connecting said first and second housing passageways to a source of atmospheric pressure, means forming an additional port in said housing adapted to be connected through said third passageway with another pressure source, a movable valving element sealingly engaging said housing means including passageway means therein for alternately connecting one of said first and second ports with said additional port while leaving the other of said first and second ports exposed to atmosphere to effect a pressure differential between said first and second ports, valve actuator means for moving said valving element into selected positions to effect a reversal of the pressure differential between said first and second ports by reversing the connection of said first and second ports with said additional port and atmosphere, said valve actuator means including a control arm, a bent lever element having one end thereof moved through a limited rotative path by said control arm acting on the opposite end thereof, an actuator arm having one end thereof pivotally secured to said housing means, said actuator arm having an opening therethrough for receiving said one end of said bent lever to operatively associate said actuator arm thereto, linkage means including said actuator arm operable to effect a limited rotational movement of said valving element relative to said ports, first spring means operatively connected between the end of said bent lever and said linkage means for biasing said valving element into first and second positions, and second spring means operatively connected between said valving element and said housing means to snap said valving element into its selected rotative positions upon rotation of said bent lever by said control arm.

6. In the combination of claim 5, said actuator arm being constructed of a low coefficient of friction plastic material for reducing noise transmission and for improving valve responsiveness by reducing inertia therein.

7. A two-way valve structure comprising housing means, means forming first, second and third passageways in said housing means, means forming first and second ports in said housing means for connecting said first and second housing passageways to a source of atmospheric pressure, means forming an additional port in said housing adapted to be connected through said third passageway with another pressure source, a movable plastic valving element sealingly engaging said housing means including passageway means therein for alternately connecting one of said first and second ports with said additional port while leaving the other of said first and second ports exposed to atmosphere to effect a pressure differential between said first and second ports, valve actuator means for moving said valving element into selected positions to effect a reversal of the pressure differential between said first and second ports by reversing the connection of said first and second ports with said additional port and atmosphere, said plastic valving element reducing friction losses during valve operation, said valve actuator means including a control arm, a bent lever element having a spherical portion on one end thereof moved through a limited rotative path by said control arm acting on the opposite end thereof, an actuator arm having one end thereof pivotally secured to said housing, said actuator arm having an opening therein for receiving the spherical portion of said bent lever to operatively connect said actuator arm thereto, linkage means including said actuator arm operable to effect a limited rotational movement of said valving element relative to said ports, first spring means operatively connected between the end of said bent lever and said linkage means for biasing said valving element into first and second positions, and second spring means operatively connected between said valving element and said housing to snap said valving element into its selected rotative positions upon a predetermined rotation of said bent lever by said control arm.

References Cited by the Examiner

UNITED STATES PATENTS

| | | | |
|---|---|---|---|
| 1,408,036 | 2/22 | Schmitt | 251—75 X |
| 2,185,889 | 1/40 | Downey | 251—75 X |
| 2,630,102 | 3/53 | Osburn | 91—327 |

M. CARY NELSON, *Primary Examiner.*